United States Patent
Kim et al.

(10) Patent No.: US 12,530,297 B2
(45) Date of Patent: Jan. 20, 2026

(54) ELECTRONIC DEVICE ALLOCATING DATA IN PLURALITY OF CACHES USING CACHE ALLOCATION RANGE INFORMATION

(71) Applicant: Samsung Electronics Co., Ltd., Suwon-si (KR)

(72) Inventors: Moongyung Kim, Suwon-si (KR); Euiyeon Won, Suwon-si (KR); Donghyeon Ham, Suwon-si (KR); Youngsik Eom, Suwon-si (KR); Ara Cho, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 19 days.

(21) Appl. No.: 18/607,858

(22) Filed: Mar. 18, 2024

(65) Prior Publication Data

US 2024/0320152 A1 Sep. 26, 2024

(30) Foreign Application Priority Data

Mar. 24, 2023 (KR) .................. 10-2023-0038958
Jun. 2, 2023 (KR) .................. 10-2023-0071787

(51) Int. Cl.
*G06F 12/00* (2006.01)
*G06F 12/0811* (2016.01)

(52) U.S. Cl.
CPC .............. *G06F 12/0811* (2013.01)

(58) Field of Classification Search
CPC ............ G06F 12/0811; G06F 12/0808; G06F 12/0815; G06F 12/084; G06F 12/0844; G06F 12/1009; G06F 12/1027
See application file for complete search history.

(56) References Cited

U.S. PATENT DOCUMENTS

| | | |
|---|---|---|
| 7,984,241 B2 | 7/2011 | Kurichiyath |
| 8,606,997 B2 | 12/2013 | Cypher et al. |
| 10,043,235 B2 | 8/2018 | Kim et al. |
| 10,862,992 B2 | 12/2020 | Wu et al. |
| 10,884,928 B2 | 1/2021 | Yoo et al. |
| 10,922,240 B2 | 2/2021 | Onishi et al. |
| 2010/0161904 A1* | 6/2010 | Cypher .............. G06F 12/0817 711/E12.024 |

FOREIGN PATENT DOCUMENTS

CN 114510441 A 5/2022

* cited by examiner

*Primary Examiner* — Shawn X Gu
(74) *Attorney, Agent, or Firm* — Harness, Dickey & Pierce, P.L.C.

(57) ABSTRACT

An electronic device including a main memory, a plurality of caches that are hierarchically connected, the plurality of caches configured to store part of data stored in the main memory, and processing circuitry configured to transmit a memory request for desired data to the plurality of caches and the main memory, the memory request including cache allocation range information associated with the desired data, and each of the plurality of caches are configured to, determine whether to perform an operation corresponding to the memory request based on the cache allocation range information.

19 Claims, 14 Drawing Sheets

ELECTRONIC DEVICE ALLOCATING DATA IN PLURALITY OF CACHES USING CACHE ALLOCATION RANGE INFORMATION

CROSS-REFERENCE TO RELATED APPLICATION

This U.S. non-provisional application claims the benefit of priority under 35 U.S.C. § 119 to Korean Patent Application Nos. 10-2023-0038958, filed on Mar. 24, 2023, and 10-2023-0071787, filed on Jun. 2, 2023, in the Korean Intellectual Property Office, the disclosures of each of which are incorporated by reference herein in their entireties.

BACKGROUND

Various example embodiments of the inventive concepts relate to an electronic device that allocates data to a plurality of caches using cache allocation range information, a system including the electronic device, a method of operating the electronic device, and/or a non-transitory computer readable medium including computer readable instructions for performing the method.

A processor included in an electronic device uses a cache for high-speed data processing. The cache may be placed between main memory, e.g., RAM, and the processor and may store data frequently accessed by the processor among data stored in the main memory. The cache has a small storage capacity in comparison to the main memory, but may process data at a high speed, e.g., the cache may operate at the same clock speed as the processor and/or a higher speed than the main memory.

In some cases, the electronic device may include a plurality of caches, and the plurality of caches may be hierarchically connected between the main memory and the processor. Here, a cache relatively close to the processor among the plurality of caches may be accessed more quickly by the processor, but may have a smaller storage capacity. On the contrary, among the plurality of caches, a cache relatively farther from the main memory may be accessed more slowly by the processor, but may have a larger storage capacity. Therefore, it is desired to develop a method of allocating data to a plurality of caches considering characteristics of the plurality of caches.

SUMMARY

Various example embodiments of the inventive concepts provide an electronic device that allocates data to a plurality of caches considering characteristics of the plurality of caches, a system including the electronic device, a method of operating the electronic device, and/or a non-transitory computer readable medium including computer readable instructions for performing the method.

According to at least one example embodiment of the inventive concepts, there is provided an electronic device including a main memory, a plurality of caches that are hierarchically connected, the plurality of caches configured to store part of data stored in the main memory, and processing circuitry configured to transmit a memory request for desired data to the plurality of caches and the main memory, the memory request including cache allocation range information associated with the desired data, and each of the plurality of caches are configured to, determine whether to perform an operation corresponding to the memory request based on the cache allocation range information.

According to at least one example embodiment of the inventive concepts, there is provided an electronic device including a main memory, a plurality of caches hierarchically connected, the plurality of caches configured to store part of data stored in the main memory, and processing circuitry configured to transmit a memory request for desired data to the plurality of caches and the main memory, the memory request including cache allocation range information associated with the desired data, and each of the plurality of caches are configured to, perform an operation based on a type of the memory request and the cache allocation range information.

According to at least one example embodiment of the inventive concepts, there is provided an electronic device including a main memory, a central processing unit (CPU) including a plurality of cores, and a bus connecting the main memory and the CPU, wherein each of the plurality of cores includes processing circuitry configured to transmit a memory request for desired data, the memory request including cache allocation range information associated with the desired data, a first level cache configured to receive the memory request from the processing circuitry, and store part of the data stored in the main memory, and a second level cache configured to receive the memory request from the first level cache, and store part of the data stored in the main memory, the CPU further includes a third level cache configured to receive the memory request from the second level cache, and store part of the data stored in the main memory, the bus further includes a fourth level cache configured to receive the memory request from the third level cache, and store part of the data stored in the main memory, the cache allocation range information includes information indicating a cache among the first level to fourth level caches in which data corresponding to the memory request may be stored, and each of the first level to fourth level caches is configured to determine whether to perform an operation corresponding to the memory request based on the cache allocation range information.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Hereinafter, various embodiments of the inventive concepts will be described in detail with reference to the accompanying drawings.

Figure 1:
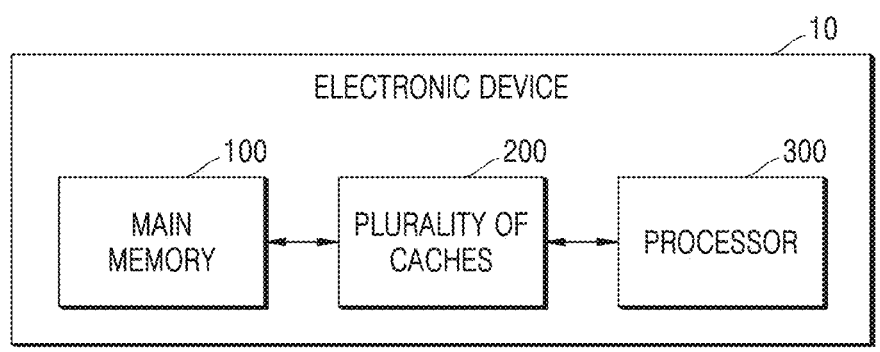
FIG. 1 is a block diagram illustrating an electronic device according to at least one example embodiment.

FIG. 1 is a block diagram illustrating an electronic device according to at least one example embodiment.

Referring to FIG. 1, an electronic device 10 according to at least one example embodiment may include a main memory 100, a plurality of caches 200, and/or at least one processor 300, etc., but the example embodiments are not limited thereto, and for example may include a greater or lesser number of constituent components.

In at least one example embodiment, the electronic device 10 may be, but is not limited to, a smartphone, a tablet, a personal computer (PC), a laptop, a smart TV, a mobile phone, a Personal Digital Assistant (PDA), a media player, a micro server, a Global Positioning System (GPS) device, an e-book terminal, a digital broadcasting terminal, a personal navigation device, a kiosk, an MP3 player, a digital camera, a home appliance, a gaming console, a virtual reality and/or augmented reality device, an Internet of Things (IoT) device, an autonomous vehicle, and/or other mobile or non-mobile computing devices. In addition, the electronic device 10 may be a wearable device, such as a watch, glasses, a hair band, a ring, and the like, having a data processing function, but the example embodiments are not limited thereto, and the electronic device 10 may include all kinds of devices operating on the basis of an operating system (OS) by using a processor.

According to some example embodiments, the main memory 100, the plurality of caches 200, and/or the processor 300, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto. For example, the main memory 100, the plurality of caches 200, and the processor 300 included in the electronic device 10 may be implemented on one system-on-chip (SoC) within the electronic device 10, but is not limited thereto.

The main memory 100 may store data used by the processor 300. The main memory 100 may include volatile memory such as static random access memory (SRAM), dynamic random access memory (DRAM), and the like. However, the example embodiments are not limited thereto, and the main memory 100 may include any type of memory that the processor 300 may access, such as flash memory, phase-change random access memory (PRAM), magnetic random access memory (MRAM), ferroelectric random access memory (FeRAM), and the like.

The plurality of caches 200 may store some pieces of data stored in the main memory 100. The plurality of caches 200 may be implemented as volatile memory (e.g., SRAM, etc.), but the example embodiments are not limited thereto.

The plurality of caches 200 may be hierarchically connected to each other. The plurality of caches 200 may be connected in series between the main memory 100 and the processor 300, but is not limited thereto. In this case, a cache directly connected to the processor 300 among the plurality of caches 200 may be an uppermost level cache, and a cache directly connected to the main memory 100 among the plurality of caches 200 may be a lowermost level cache. An example of a more detailed connection structure of the plurality of caches 200 will be described later with reference to FIG. 2.

The processor 300 may control the overall operation of the electronic device 10. In at least one example embodiment, the processor 300 may be a central processing unit (CPU), but is not limited thereto, and for example, may be an application processor, a graphics processing unit (GPU), a neural processing unit (NPU), an image signal processor (ISP), etc.

The processor 300 may transmit a request (e.g., memory request, etc.) to the plurality of caches 200 and the main memory 100, etc. In an example, the processor 300 may transmit to the plurality of caches 200 and the main memory 100 a write request for data generated through an operation. In another example, the processor 300 may transmit to the plurality of caches 200 and the main memory 100 a read request for data for an operation.

In at least one example embodiment, the processor 300 may transmit to the plurality of caches 200 and the main memory 100 a request (e.g., memory request, etc.) including cache allocation range information, etc. The cache allocation range information includes information indicating the at least one cache in which data corresponding to the request may be stored from among the plurality of caches. In an example, the cache allocation range information may include information indicating that data corresponding to the request may be stored in a lowermost level cache from among the plurality of caches 200, etc. In another example, the cache allocation range information may include information indicating that data corresponding to the request may be stored in an uppermost level cache and a second uppermost level cache from among the plurality of caches 200, etc. In another example, the cache allocation range information may include information indicating that data corresponding to the request may be stored in all of the plurality of caches 200, etc.

Each of the plurality of caches 200 may determine whether to perform an operation corresponding to the request based on the cache allocation range information. In an example, when the processor 300 transmits a write request including cache allocation range information to the plurality of caches 200, the plurality of caches 200 may determine whether to perform an operation corresponding to the write request based on the cache allocation range information. In another example, when the processor 300 transmits a read request including cache allocation range information to the plurality of caches 200, the plurality of caches 200 may determine whether to perform an operation corresponding to the read request based on the cache allocation range information.

The electronic device 10 according to some of the example embodiments as described above may improve the performance of the plurality of caches 200 included in the electronic device 10 by determining whether to perform an operation corresponding to the request based on the cache allocation range information.

Figure 2:
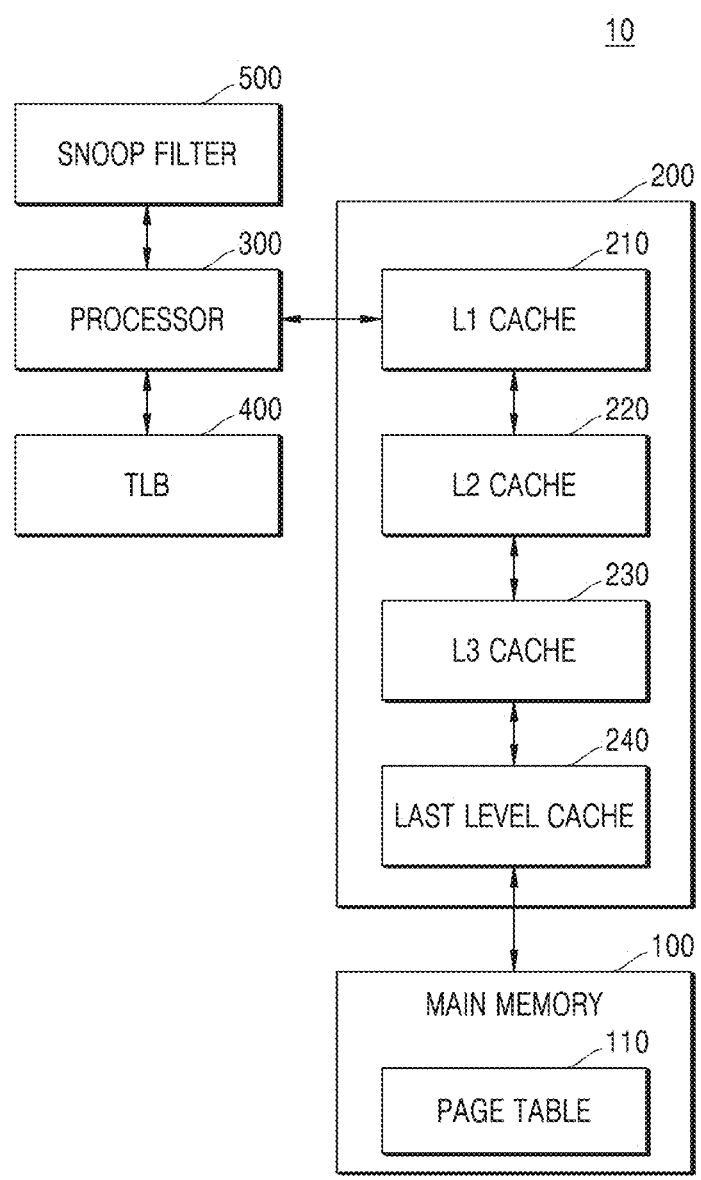
FIG. 2 is a block diagram illustrating in more detail connections between components included in an electronic device according to at least one example embodiment.

FIG. 2 is a block diagram illustrating in more detail connections between components included in an electronic device according to at least one example embodiment.

Referring to FIG. 2, an electronic device 10 according to at least one example embodiment may include main memory 100, a plurality of caches 200, and at least one processor 300, etc., but is not limited thereto. In addition, the electronic device 10 according to at least one example embodiment may further include a Translation Look-aside Buffer (TLB) 400 and/or a snoop filter 500, etc. According to some example embodiments, the main memory 100, the plurality of caches 200, the at least one processor 300, the TLB 400 and/or the snoop filter 500, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

In at least one example embodiment of FIG. 2, the plurality of caches 200 may include a first level cache (hereinafter referred to as Level 1 (L1) cache) 210, a second level cache (hereinafter referred to as Level 2 (L2) cache) 220, a third level cache (hereinafter referred to as Level 3 (L3) cache) 230, and a last level cache (hereinafter referred to as Last Level cache (LLC)) 240, but the example embodiments are not limited thereto, and for example, there may be a greater or lesser number of caches in the plurality of caches 200.

Hereinafter, a cache having a relatively low level number among the plurality of caches 200 may be referred to as a higher level cache. For example, the L2 cache 220 with a level number of 2 may be referred to as a higher level cache than the L3 cache 230 with a level number of 3. In addition, a cache having a relatively high level number among the plurality of caches 200 may be referred to as a lower level cache. For example, the L2 cache 220 with a level number of 2 may be referred to as a lower level cache than the L1 cache 210 with a level number of 1.

The L1 cache 210 may be connected between the processor 300 and the L2 cache 220. The L1 cache 210 may be directly connected to the processor 300. The L1 cache 210 may be connected to the main memory 100 through the L2 cache 220, the L3 cache 230, and the LLC 240, etc. The L1 cache 210 may be referred to as an uppermost level cache.

The L2 cache 220 may be connected between the L1 cache 210 and the L3 cache 230. The L2 cache 220 may be connected to the processor 300 through the L1 cache 210. The L2 cache 220 may be connected to the main memory 100 through the L3 cache 230 and the LLC 240, etc. The L2 cache 220 may be referred to as a second uppermost level cache.

The L3 cache 230 may be connected between the L2 cache 220 and the LLC 240. The L3 cache 230 may be connected to the processor 300 through the L1 cache 210 and the L2 cache 220. The L3 cache 230 may be connected to the main memory 100 through the LLC 240, etc. The L3 cache 230 may be referred to as a second lowermost level cache.

The LLC 240 may be connected between the L3 cache 230 and the main memory 100. The LLC 240 may be connected to the processor 300 through the L1 cache 210, the L2 cache 220, and the L3 cache 230, etc. The LLC 240 may be directly connected to the main memory 100. The LLC 240 may be referred to as the lowermost level cache.

The main memory 100 may be divided into a program area and a page table area, but is not limited thereto. The program area of the main memory 100 may store data used by the processor 300, etc. The page table area of the main memory 100 may store a page table 110 for storing information on and/or associated with data stored in the program area.

The page table 110 may include a plurality of page entries. Each of the plurality of page entries may store information corresponding to a corresponding page of a plurality of pages included in the program area of the main memory 100. In at least one example embodiment, the page entry may store cache allocation range information, etc.

The TLB 400 may store some of the plurality of page entries (e.g., a subset of page entries, etc.) included in the page table 110. The TLB 400 may store a page entry corresponding to data accessed by the processor 300 among the plurality of page entries. In an example, the TLB 400 may store a page entry corresponding to a program area of the main memory 100 subject to a read command of the processor 300, but is not limited thereto. In another example, the TLB 400 may store a page entry corresponding to a program area of the main memory 100 subject to a write command of the processor 300, but is not limited thereto. In this case, the page entry may be transmitted to the processor 300 together with read data and/or a response to a write request, and stored in the TLB 400, etc.

The TLB 400 may be accessed by the processor 300, and accordingly, the processor 300 may use some of the plurality of page entries without having to access the main memory 100.

A more detailed structure of the page table 110 and the TLB 400 may be described in more detail with reference to FIG. 3.

Figure 3:
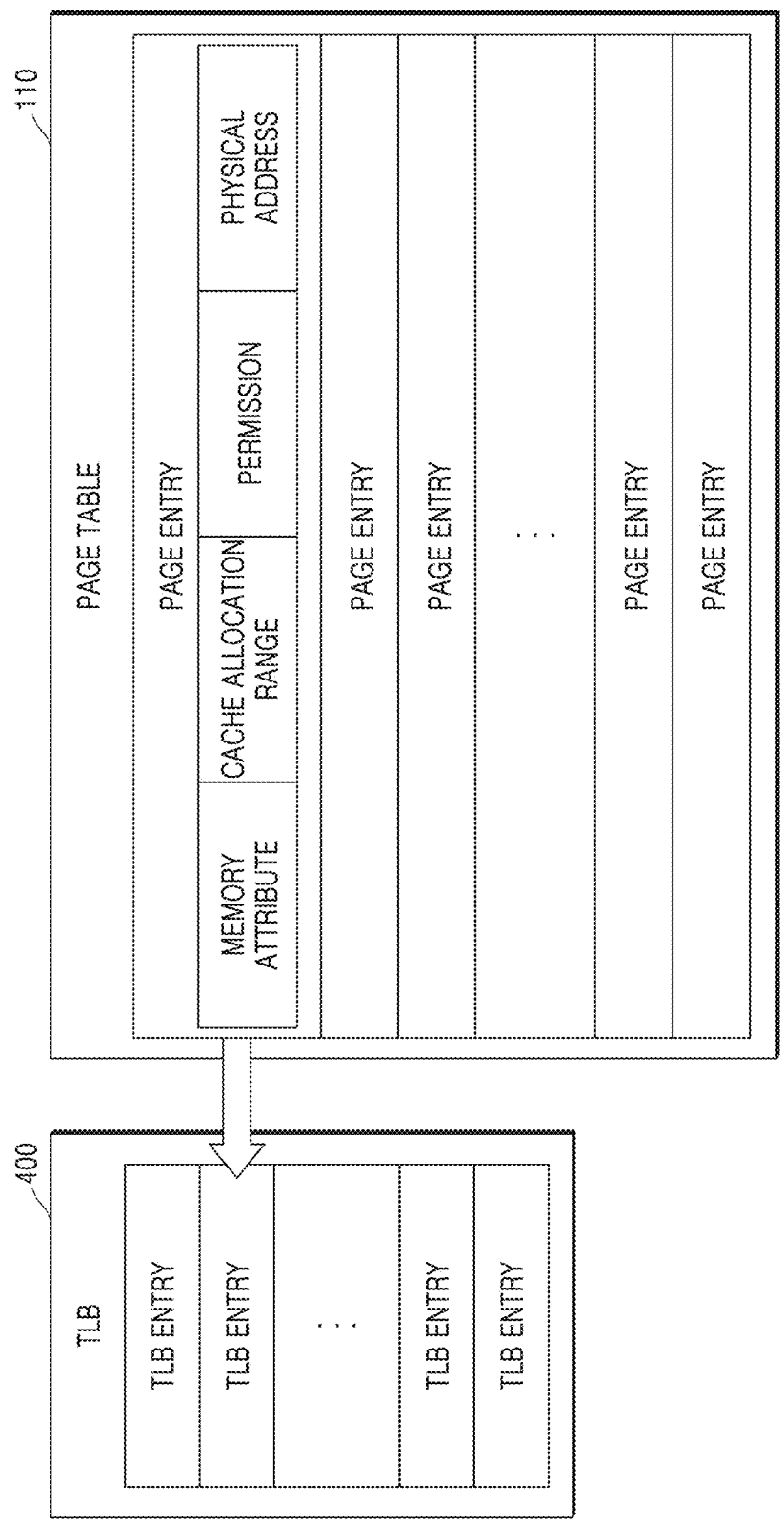
FIG. 3 is a diagram illustrating a detailed structure of a page table and a translation look-aside buffer included in an electronic device according to at least one example embodiment.

FIG. 3 is a diagram illustrating a detailed structure of a page table and a TLB included in an electronic device according to at least one example embodiment.

Referring to FIG. 3, a page table 110 and a TLB 400 according to at least one example embodiment may be identified.

The page table 110 may include a plurality of page entries. In addition, each of the plurality of page entries may include memory attribute information, cache allocation range information, permission information, and/or physical address information, etc., but is not limited thereto.

The memory attribute information may be information indicating whether data corresponding to a page entry may be allocated to a cache of the plurality of caches, or in other words whether the data has been stored in cache or not.

The permission information may be information indicating whether the processor 300 that has transmitted the request to the program area of the main memory 100 corresponding to the page entry is accessible and/or the permission level (e.g., the privilege level) of the computer process, computer thread, virtual machine instance, etc., data requesting operation desired for access to the program area, etc.

The physical address information may be information for converting a virtual address into a physical address, such as a virtual address included in a request received from the processor 300 corresponding to the page entry.

The cache allocation range information includes information indicating a cache among the plurality of caches in which data corresponding to the request may be stored from among the plurality of caches. The cache allocation range information may include allocation start level information and allocation end level information, but is not limited thereto.

The allocation start level information may indicate a cache of the uppermost level among the caches in which data corresponding to the request may be stored. In an example, when the cache allocation range information includes L1 to L3 caches, the allocation start level information may be the L1 cache. In other words, when the cache allocation range information includes the L1 cache, the allocation start level information may be the L1 cache because the L1 cache is the highest level cache among the caches indicated in the cache allocation range information, but the example embodiments are not limited thereto.

The allocation end level information may indicate a cache of the lowermost level among the caches in which data corresponding to the request may be stored. In an example, when the cache allocation range information includes L1 to L3 caches, the allocation end level information may be the L3 cache. In another example, when the cache allocation range information includes the L3 cache, the allocation end level information may be the L3 cache because the L3 cache is the lowest level cache among the caches indicated in the cache allocation range information, but the example embodiments are not limited thereto.

In at least one example embodiment, the cache allocation range information may be configured based on any one of a delay time and throughput desired and/or required for processing a request, but the example embodiments are not limited thereto.

In an example, when the data corresponding to the cache allocation range information is data that desires and/or requires fast processing speed, such as a coefficient used in the operation of the processor 300, the cache allocation range information may be configured based on the delay time desired and/or required to process the request. Here, when the delay time desired and/or required for processing the request is less than a desired and/or preset reference delay time, the cache allocation range information may be configured to include an uppermost level cache (for example, including L1 cache and L2 cache), but the example embodiments are not limited thereto.

In another example, when the data corresponding to the cache allocation range information is data that occupies a large amount of memory (e.g., data having a large size, etc.), such as buffer data of the processor 300, the cache allocation range information may be configured based on the throughput desired and/or required to process the request. Here, when the throughput desired and/or required for processing the request is greater than or equal to a desired and/or preset reference throughput, the cache allocation range information may be configured to include a lowermost level cache (for example, including L3 cache and LLC, etc.), but the example embodiments are not limited thereto.

In at least one example embodiment, the cache allocation range information may be configured based on the intended use of data.

In an example, when the data is data mainly used for the operation of the processor 300, the cache allocation range information may be configured to include the uppermost level cache (e.g., including only L1 cache, or L1 cache and L2 cache), but is not limited thereto. In addition, when the data is data related to the code (e.g., application code, program code, etc.) used in the processor 300, the cache allocation range information may be configured to include the uppermost level cache (e.g., including L1 cache and L2 cache). In addition, when the data is data related to the stack used in the processor 300, the cache allocation range information may be configured to include the uppermost level cache (e.g., including L1 cache and L2 cache).

In another example, when the data is data shared with other processing devices other than the processor 300 where large amount of data transmission is expected, the cache allocation range information may be configured to include the lowermost level cache (e.g., including L2 cache, L3 cache, and LLC). In addition, when data transmission between threads is expected, the cache allocation range information may be configured to include the lowermost level cache (e.g., including L3 cache and LLC).

In another example, when the data is data related to the heap used in the processor 300, the cache allocation range information may be configured to include all level caches.

The TLB 400 may include a plurality of TLB entries. One or more page entries may be stored in each of the plurality of TLB entries. In this case, the page entry stored in the TLB entry may store a page entry corresponding to data accessed by the processor 300.

Referring back to FIG. 2, the processor 300 may transmit a request to the plurality of caches 200 and the main memory 100. In this case, the request transmitted by the processor 300 may be one of a write request and a read request, etc., but is not limited thereto.

In at least one example embodiment, each of the plurality of caches 200 may determine, upon receiving the request, whether data corresponding to the request may be stored internally in the respective cache based on the cache allocation range information. In an example, the L1 cache 210 may determine whether the L1 cache 210 is included in the cache allocation range information included in the request, and thus may determine whether data corresponding to the request may be stored inside the L1 cache 210.

When the respective cache determines that the data corresponding to the request may be stored internally, the respective cache of the plurality of caches 200 may perform an operation corresponding to the request. In an example, when the L1 cache 210 is included in the cache allocation range information included in the request, is the L1 cache 210 determines that the data corresponding to the request may be stored inside the L1 cache 210, and thus, the operation corresponding to the request may be performed.

When the respective cache determines that the data corresponding to the request may not be stored internally, the respective cache of the plurality of caches 200 may not perform (e.g., skip performing) an operation corresponding to the request. In an example, when the L1 cache 210 is not included in the cache allocation range information included in the request, the L1 cache 210 determines that the data corresponding to the request may not be stored inside the L1 cache 210, and thus, the L1 cache 210 does not perform the operation corresponding to the request.

When a request received from the processor 300 is a write request, each of the plurality of caches 200 may store write data internally and transmit the write request to the lower level cache or the main memory 100 if it is determined that write data corresponding to the write request may be stored internally. In an example, when the write data may be stored internally, the L1 cache 210 may store the write data internally and transmit the write request to the L2 cache 220. In an example, when the write data may be stored internally, the LLC 240 may store the write data internally and transmit the write request to the main memory 100.

In addition, when the request received from the processor 300 is a write request, each of the plurality of caches 200 may transmit the write request to the lower level cache or the main memory 100 without storing the write data internally if the respective cache determines that the write data may not be stored internally based on the cache allocation range information. In an example, when the write data may not be stored internally, the L1 cache 210 may transmit the write request to the L2 cache 220 without storing the write data internally. In an example, when the write data may not be stored internally, the LLC 240 may transmit the write request to the main memory 100 without storing the write data internally.

Additionally, when the request received from the processor 300 is a write request, each of the plurality of caches 200 may search for cache data corresponding to the write data internally if the respective cache determines that write data may not be stored internally based on cache allocation range information. In addition, each of the plurality of caches 200 may delete cache data corresponding to the write data when the cache data corresponding to the write data is found therein. Accordingly, data not corresponding to the cache allocation range information may not be stored and/or may be prevented from being stored in the plurality of caches 200.

Upon receiving the write request, the main memory 100 may store write data corresponding to the write request.

When the request received from the processor 300 is a read request, each of the plurality of caches 200 may search for read data internally if the respective cache determines that read data corresponding to the read request may be stored internally based on cache allocation range information. For example, if the cache allocation range information indicates that all of the plurality of caches 200 may store the requested data, the plurality of caches 200 internally search for read data in a hierarchical order (e.g., from the L1 cache 210 to LLC cache 240, etc.). If the highest possible cache does not find the requested data, the highest possible cache forwards the read request to the next cache of the plurality of possible caches until the read data is found or the read request is transmitted to the main memory 100. In an example, when the cache allocation range information indicates that the read data may be stored in the L2 cache 220 to the L3 cache 230, the L2 cache 220 may search for the read data internally first.

In this case, when the read data is found therein, of the respective cache of the plurality of caches 200 may transmit the read data to the processor 300. In one example, when the read data is found therein, the L2 cache 220 may transmit the read data to the processor 300.

Conversely, when the read data is not found internally, each of the plurality of caches 200 may transmit a read request to the lower level cache or the main memory 100. In an example, the L2 cache 220 may transmit a read request to the L3 cache 230 when read data is not found therein. In a different example, when the read data is not found internally, the LLC 240 may transmit a read request to the main memory 100.

In addition, when the request received from the processor 300 is a read request, each of the plurality of caches 200 may transmit the read request to the lower level cache or the main memory 100 if the respective cache determines that read data may not be stored internally based on the cache allocation range information. In an example, when the read data may not be stored therein, the L3 cache 230 may transmit a read request to the LLC 240. In another example, when the read data may not be stored therein, the LLC 240 may transmit a read request to the main memory 100.

Additionally, when the request received from the processor 300 is a read request, each of the plurality of caches 200 may search for cache data corresponding to the read data internally if the respective cache determines that read data may not be stored internally based on cache allocation range information. In addition, when cache data corresponding to read data is found internally, each of the plurality of caches 200 may transmit cache data corresponding to the read data to a higher level cache or the processor 300 and delete cache data corresponding to the read data. Accordingly, data not corresponding to the cache allocation range information may not be stored or may be prevented from being stored in the plurality of caches 200.

Upon receiving the read request, the main memory 100 may transmit read data and cache allocation range information corresponding to the read data to the plurality of caches 200 and the processor 300.

Upon receiving read data and cache allocation range information corresponding to read data from the main memory 100, each of the plurality of caches 200 may determine whether the read data may be stored internally based on the cache allocation range information corresponding to the read data.

When the respective cache determines that read data may be stored internally based on cache allocation range information corresponding to the read data, each of the plurality of caches 200 may store the read data internally and transmit the read data and cache allocation range information corresponding to the read data to the higher level cache or the processor 300. In an example, the LLC 240 may store read data internally and transmit the read data and cache allocation range information corresponding to the read data to the L3 cache 230 when the read data may be stored internally. In another example, when the read data may be stored internally, the L1 cache 210 may store the read data internally and transmit the read data and cache allocation range information corresponding to the read data to the processor 300. Additionally, according to at least one example embodiment, the read data may be stored in accordance with a cache replacement policy, e.g., least recently used (LRU), least frequently used (LFU), first in first out (FIFO), random replacement (RR), etc., corresponding to the respective cache of the plurality of caches 200.

In addition, when the respective cache determines that read data may not be stored internally based on the cache allocation range information corresponding to the read data, each of the plurality of caches 200 may transmit the read data and cache allocation range information corresponding to the read data to the higher level cache or the processor 300 without storing the read data internally. In an example, the LLC 240 may transmit the read data and cache allocation range information corresponding to the read data to the L3 cache 230 without storing the read data internally when the read data may not be stored internally in the LLC 240. In another example, when the read data may not be stored internally in the L1 cache 210, the L1 cache 210 may transmit the read data and cache allocation range information corresponding to the read data to the processor 300 without storing the read data internally.

Upon receiving the read data and the cache allocation range information corresponding to the read data, the processor 300 may store the cache allocation range information corresponding to the read data in the TLB 400.

The snoop filter 500 may be a filter used to search for where data corresponding to the request is stored from among the plurality of caches 200. In at least one example embodiment, the snoop filter 500 may store cache allocation range information. In addition, the snoop filter 500 may search for, identify, and/or determine which cache among the plurality of caches 200 stores data corresponding to the request based on the cache allocation range information. Accordingly, the performance of the snoop filter 500 may be further improved.

Each of the plurality of caches 200 included in the electronic device 10 according to some of the example embodiments as described above may provide better performance by determining whether to perform an operation corresponding to a request based on cache allocation range information, and more specifically, improving the speed of accessing the plurality of caches 200 to retrieve cached data and/or to reducing the number of cache accesses, etc.

Figure 4:
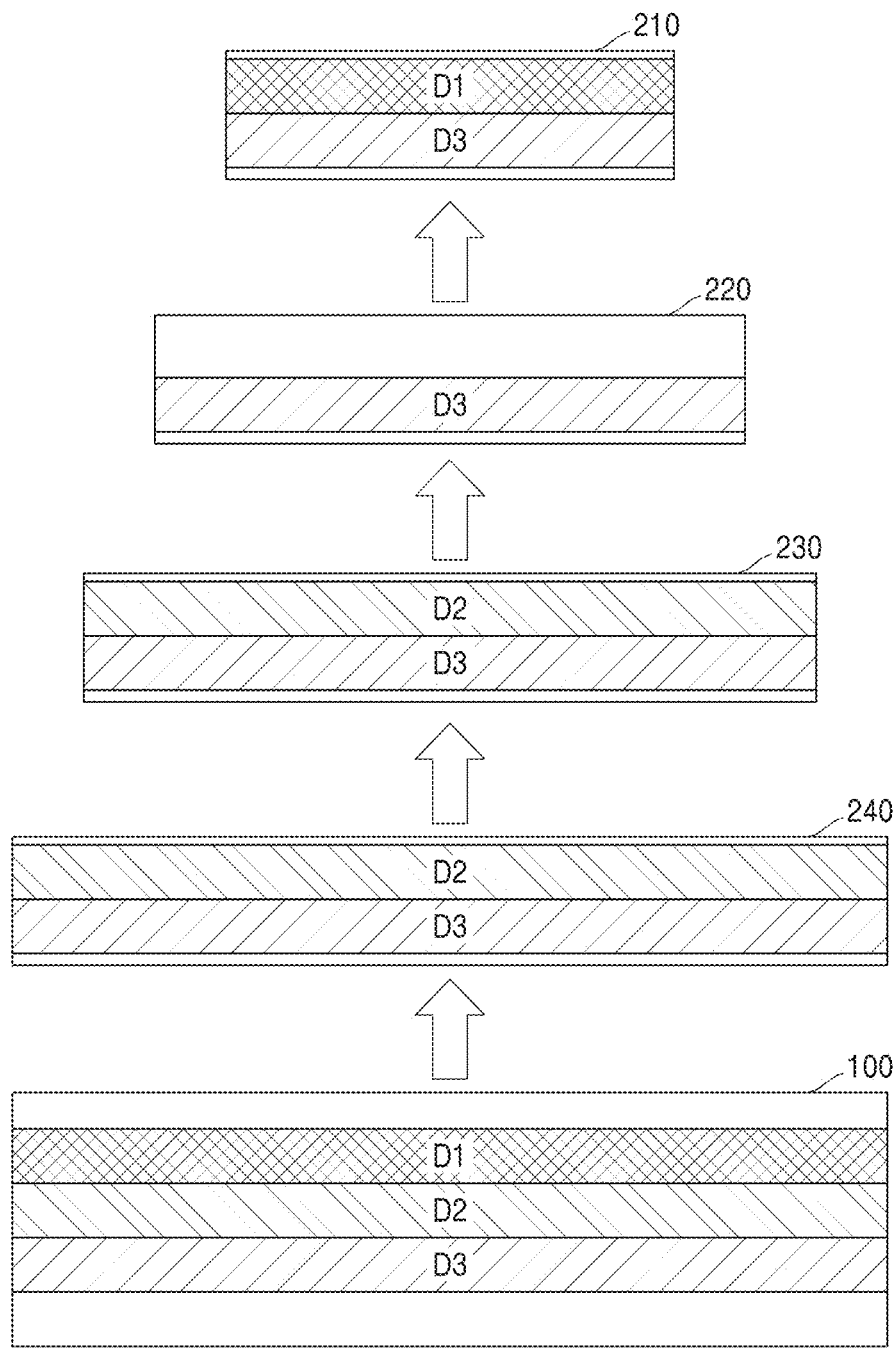
FIG. 4 is a diagram illustrating an example in which data is allocated to a plurality of caches of an electronic device according to at least one example embodiment.

FIG. 4 is a diagram illustrating an example in which data is allocated to a plurality of caches of an electronic device according to at least one example embodiment.

Referring to FIG. 4, at least one example embodiment in which data transmitted from the main memory 100 to the processor 300 is allocated to a plurality of caches 200, that is, 210 to 240, may be confirmed.

In at least one example embodiment of FIG. 4, the main memory may transmit a plurality of data, e.g., first data D1, second data D2, and third data D3, etc., to the processor 300 through the plurality of caches 200, that is, 210 to 240. In this case, the first data D1 may be data in which the corresponding cache allocation range information is the L1 cache 210. The second data D2 may be data in which corresponding cache allocation range information is the L3 cache 230 and the LLC 240. The third data D3 may be data in which corresponding cache allocation range information is all of the plurality of caches 200.

First, the main memory 100 may transmit the plurality of data, e.g., the first data D1, the second data D2, and the third data D3, and the corresponding cache allocation range information to the LLC 240.

The LLC 240 may determine which of the first data D1, the second data D2, and the third data D3 may be stored in the LLC 240 based on the cache allocation range information. For FIG. 4, the LLC 240 may store the second data D2 and the third data D3 therein, and may not store the first data D1 therein. In addition, the LLC 240 may transmit the plurality of data, e.g., first data D1, the second data D2, and the third data D3, and the cache allocation range information to the L3 cache 230.

The L3 cache 230 may determine which of the first data D1, the second data D2, and the third data D3 may be stored in the L3 cache 230 based on the cache allocation range information. In at least one example embodiment of FIG. 4, the L3 cache 230 may store the second data D2 and the third data D3 therein, and may not store the first data D1 therein.

In addition, the L3 cache 230 may transmit the first data D1, the second data D2, and the third data D3 and the cache allocation range information to the L2 cache 220.

The L2 cache 220 may determine which of the first data D1, the second data D2, and the third data D3 may be stored in the L2 cache 220 based on the cache allocation range information. In at least one example embodiment of FIG. 4, the L2 cache 220 may store the third data D3 therein, and may not store the first data D1 and the second data D2 therein. In addition, the L2 cache 220 may transmit the first data D1, the second data D2, and the third data D3 and the cache allocation range information to the L1 cache 210.

The L1 cache 210 may determine which of the first data D1, the second data D2, and the third data D3 may be stored in the L1 cache 210 based on the cache allocation range information. In at least one example embodiment of FIG. 4, the L1 cache 210 may store the first data D1 and the third data D3 therein, and may not store the second data D2 therein.

Figure 5:
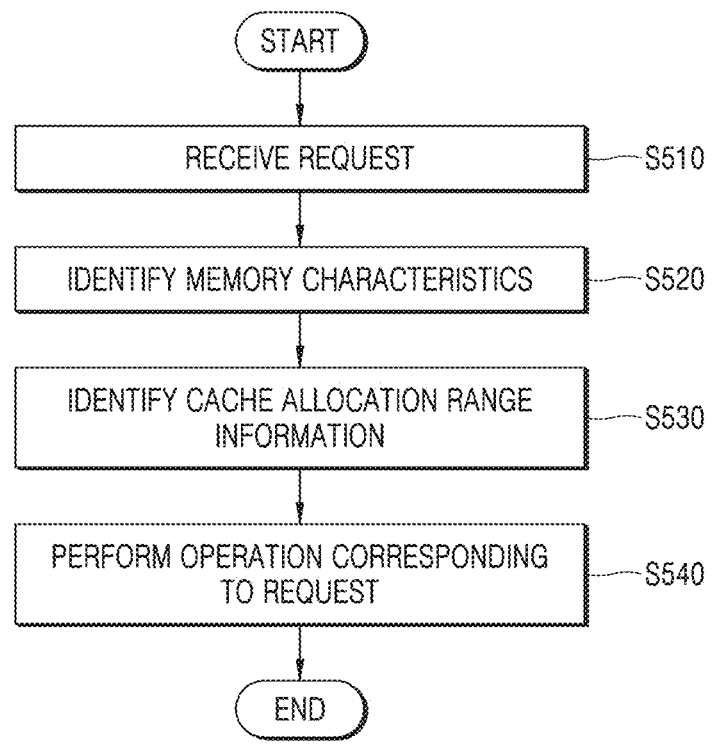
FIG. 5 is a flowchart illustrating a method of operating a cache included in an electronic device, according to at least one example embodiment.

FIG. 5 is a flowchart illustrating a method of operating a cache included in an electronic device, according to at least one example embodiment.

Referring to FIG. 5, in operation S510, each of the plurality of caches 200 may receive a request (e.g., a memory access request, such as a read request, a write request, etc.) from the processor 300. In this case, the request received from the processor 300 may include a page entry corresponding to the request, but is not limited thereto.

In operation S520, each of the plurality of caches 200 may identify memory characteristics, such as memory attribute information, cache allocation range information, permission information, and/or physical address information, etc., in the page entry included in the request. Each of the plurality of caches 200 may determine whether data corresponding to the received request may be allocated therein based on the memory characteristics. In this case, when a cache of the plurality of caches 200 determines that the data corresponding to the received request may not be allocated to the cache based on the memory attribute information, the permission information, and/or the physical address information, etc., the cache may terminate the requested operation without performing the requested operation, but is not limited thereto. However, according to at least one example embodiment, the cache of the plurality of caches 200 may forward the terminated request to the next cache of the plurality of caches 200 or the main memory 100, etc.

In operation S530, each of the plurality of caches 200 may identify cache allocation range information in the page entry included in the request. Each of the plurality of caches 200 may determine whether to perform an operation corresponding to the request based on the identified cache allocation range information. In this case, when the respective cache determines that an operation corresponding to the request is not to be performed based on the cache allocation range information not matching the respective cache, the respective cache of the plurality of caches 200 may terminate the operation without performing the requested operation and may forward the request to the next cache.

In operation S540, in response to the cache allocation range information indicating that the respective cache may perform the requested operation, the respective cache may perform an operation corresponding to the request. In an example, when the request is a write request, each of the eligible caches of the plurality of caches 200 may store write data corresponding to the write request therein. In another example, when the request is a read request, each of the eligible caches of the plurality of caches 200 may search for read data corresponding to the read request internally.

Figure 6:
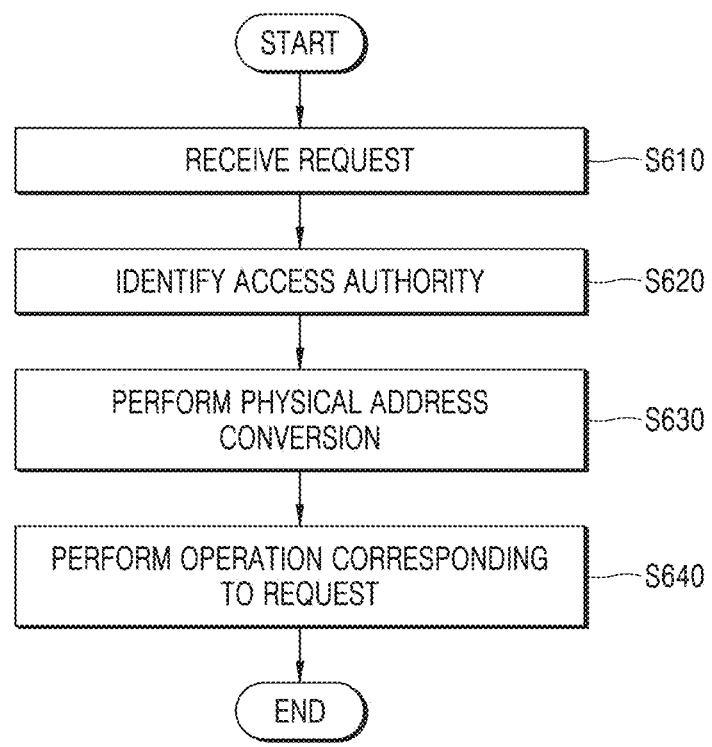
FIG. 6 is a flowchart illustrating a method of operating a Translation Look-aside Buffer (TLB) and a processor included in an electronic device according to at least one example embodiment.

FIG. 6 is a flowchart illustrating a method of operating a TLB and at least one processor included in an electronic device, according to at least one example embodiment.

Referring to FIG. 6, in operation S610, the TLB 400 may receive a request (e.g., a memory operation request, such as a read operation, a write operation, etc.) from the at least one processor 300, but is not limited thereto. In this case, the request received from the processor 300 may include a page entry corresponding to the request, but is not limited thereto, and for example, may include a virtual address corresponding to the requested data, etc.

In operation S620, the TLB 400 may identify access rights (e.g., permission information, etc.) in the page entry included in the request based on the information recorded therein. The processor 300 may determine whether an operation on data corresponding to the received request may be performed based on the access authority identified by the TLB 400. In this case, when the operation related to the data corresponding to the received request may not be performed due to the access rights (e.g., permission information, permission level, privilege level, etc.) of the requested data, the processor 300 may perform an internal operation related to authority infringement, attempted unauthorized memory access, suspected security attack, etc., and terminate the operation without generating a request to the cache 200 and/or the main memory 100, etc., but the example embodiments are not limited thereto.

In operation S630, the processor 300 may perform virtual address to physical address conversion for the requested data based on the physical address information in the page entry included in the request.

In operation S640, the processor 300 may perform an operation corresponding to the request based on the physical address obtained in operation S630. In an example, when the request is a write request, the processor 300 may generate a request to store the write data corresponding to the write request in the physical address obtained in operation S630, etc. In another example, when the request is a read request, the processor 300 may generate a request to obtain read data corresponding to the read request from the physical address obtained in operation S630, etc.

Figure 7:
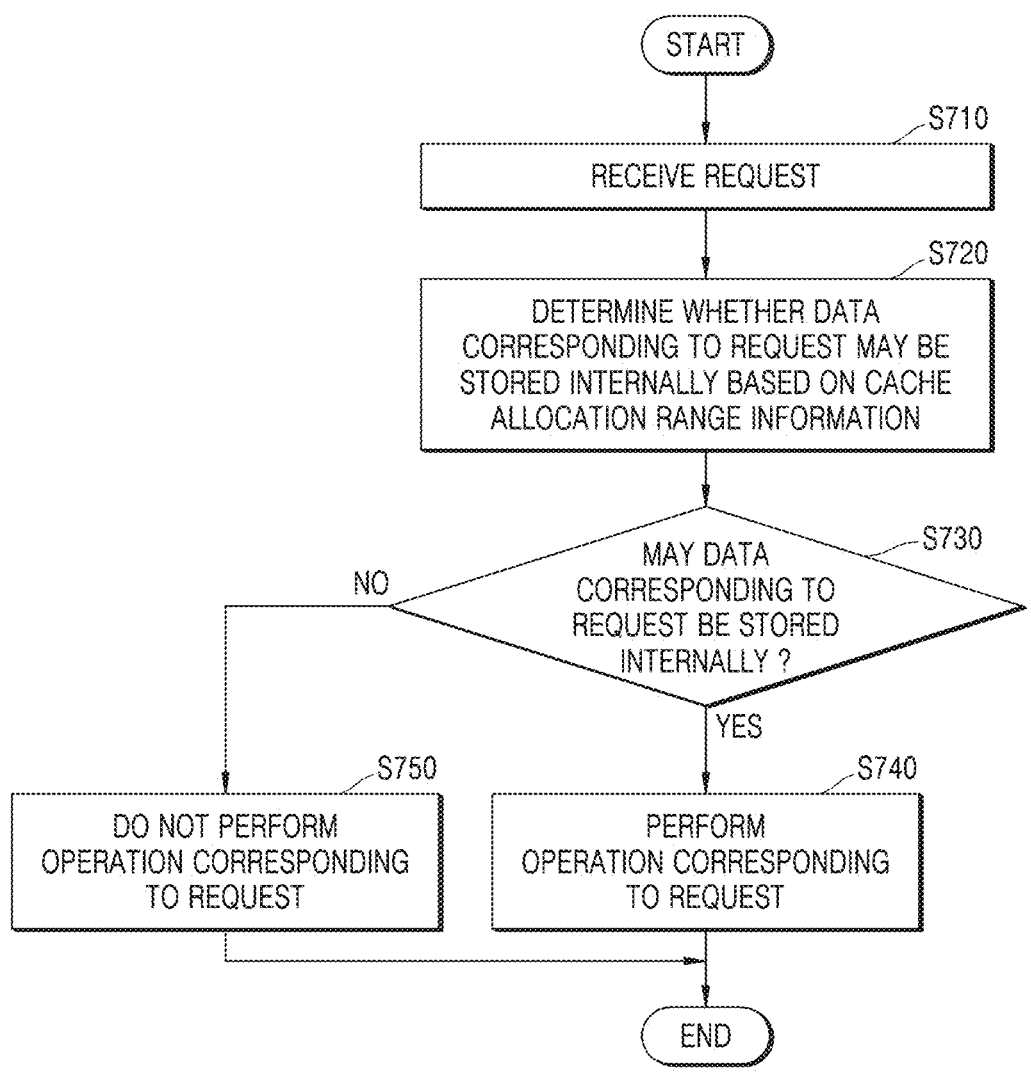
FIG. 7 is a flowchart illustrating an operation when a cache included in an electronic device receives a request, according to at least one example embodiment.

FIG. 7 is a flowchart illustrating an operation when a cache included in an electronic device receives a request, according to at least one example embodiment.

Referring to FIG. 7, in operation S710, each of the plurality of caches 200 may receive a request (e.g., memory access request, etc.).

In operation S720, each of the plurality of caches 200 may determine whether data corresponding to the request (e.g., the requested data, etc.) may be stored internally based on cache allocation range information included in the request.

Each cache of the plurality of caches 200 may determine whether it is included in the cache allocation range information included in the request, and thus the respective cache may determine whether data corresponding to the request may be stored therein. Each cache of the plurality of caches 200 may determine whether it is not included in the cache allocation range information included in the request, and thus may determine whether data corresponding to the request may not be stored therein.

In operation S730, when a cache of the plurality of caches 200 determines that the data corresponding to the request may be stored in the cache as a result of the determination of operation S720, the respective cache may move to operation S740.

In operation S740, the respective cache of the plurality of caches 200 may perform an operation (e.g., memory access operation, etc.) corresponding to the request.

On the contrary, in operation S730, when a cache of the plurality of caches 200 determines that the data corresponding to the request may not be stored internally as a result of the determination of operation S720, the respective cache of the plurality of caches 200 may move to operation S750.

In operation S750, the respective cache of the plurality of caches 200 may not perform an operation (e.g., memory access operation, etc.) corresponding to the request, or in other words, the respective cache skips performance of the requested memory operation, but is not limited thereto.

Figure 8:
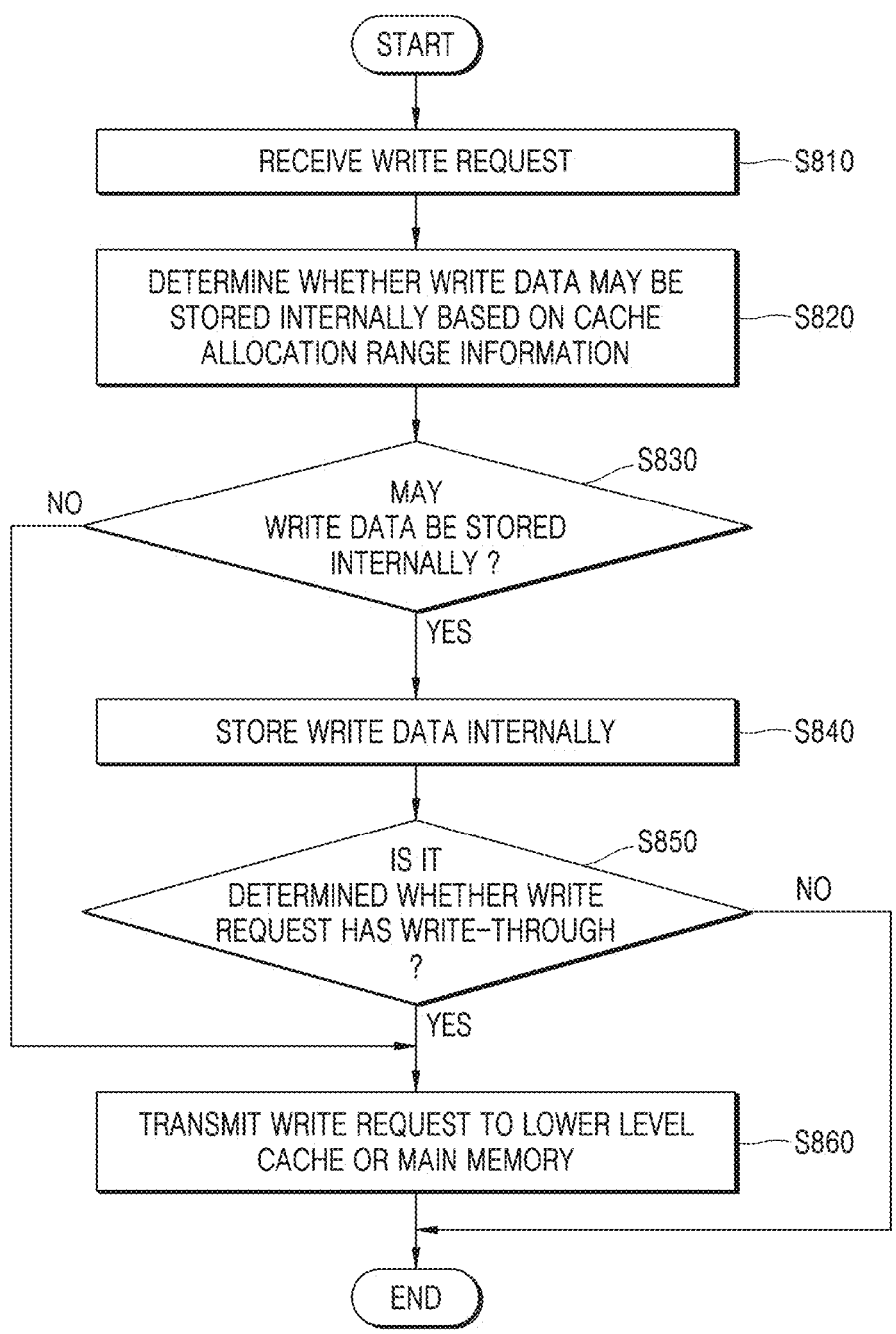
FIG. 8 is a flowchart illustrating an operation when a cache included in an electronic device receives a write request, according to at least one example embodiment.

FIG. 8 is a flowchart illustrating an operation when a cache included in an electronic device receives a write request according to at least one example embodiment.

Referring to FIG. 8, in operation S810, each of a plurality of caches 200 may receive a write request.

In operation S820, each of the plurality of caches 200 may determine whether write data may be stored internally based on cache allocation range information included in the write request.

Each cache of the plurality of caches 200 may determine whether it is included in the cache allocation range information included in the write request, and thus the respective cache may determine whether write data may be stored therein. The respective cache of the plurality of caches 200 may determine whether it is not included in the cache allocation range information included in the write request, and thus may determine whether write data may not be stored therein.

In operation S830, when the respective cache determines that the write data may be stored internally as a result of the determination of operation S820, the respective cache of the plurality of caches 200 may move to operation S840.

In operation S840, the respective cache of the plurality of caches 200 may store write data therein.

In addition, the program may move to operation S850, and the respective cache of the plurality of caches 200 may determine whether the write request has a write-through characteristic.

When the respective cache determines that the write request has a write-through characteristic, the program may move to operation S860 and the respective cache of the plurality of caches 200 may transmit a write request to a lower level cache and/or the main memory 100, etc.

When the respective cache determines that the write request does not have a write-through characteristic, the respective cache of the plurality of caches 200 may terminate the requested operation without performing an additional memory operation.

On the contrary, in operation S830, when the respective cache determines that the data corresponding to the request may not be stored therein as a result of the determination of operation S820, the respective cache of the plurality of caches 200 may move immediately to operation S860 to transmit the write request to the lower level cache and/or the main memory 100.

Figure 9:
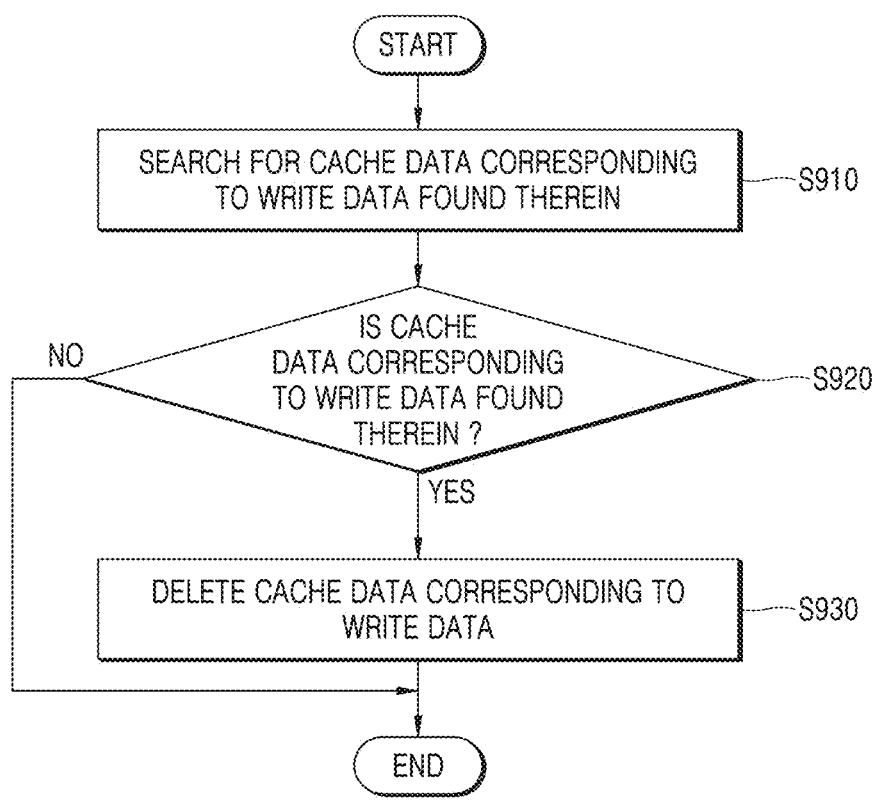
FIG. 9 is a flowchart illustrating an operation that may be additionally performed when a cache included in an electronic device according to at least one example embodiment is determined to be negative (No) in operation S830 of FIG. 8.

FIG. 9 is a flowchart illustrating an operation that may be additionally performed when a cache included in an electronic device according to at least one example embodiment is determined to be negative (No) in operation S830 of FIG. 8.

Referring to FIG. 9, when the respective cache determines that write data may not be stored internally, in operation S830 of FIG. 8, the respective cache of the plurality of caches 200 may search for previously stored cache data corresponding to the write data in operation S910, or in other words, the respective cache may determine whether out-of-date data, stale data, and/or invalid data corresponding to the write data is stored in itself.

In operation S920, the respective cache of the plurality of caches 200 may determine whether previously stored cache data corresponding to the write data is found internally.

When the previously stored cache data corresponding to the write data is not found internally, each of the plurality of caches 200 may terminate the operation without performing an additional memory operation, but is not limited thereto.

On the contrary, when the respective cache finds the cache data corresponding to the write data internally, the respective cache of the plurality of caches 200 may delete the previously stored cache data corresponding to the write data in operation S930. Accordingly, data not corresponding to the current write operation may be reduced and/or prevented from being stored in the plurality of caches 200. In this case, the respective cache of the plurality of caches 200 may additionally use the cache data corresponding to the write data to supplement the write-requested data.

Figure 10:
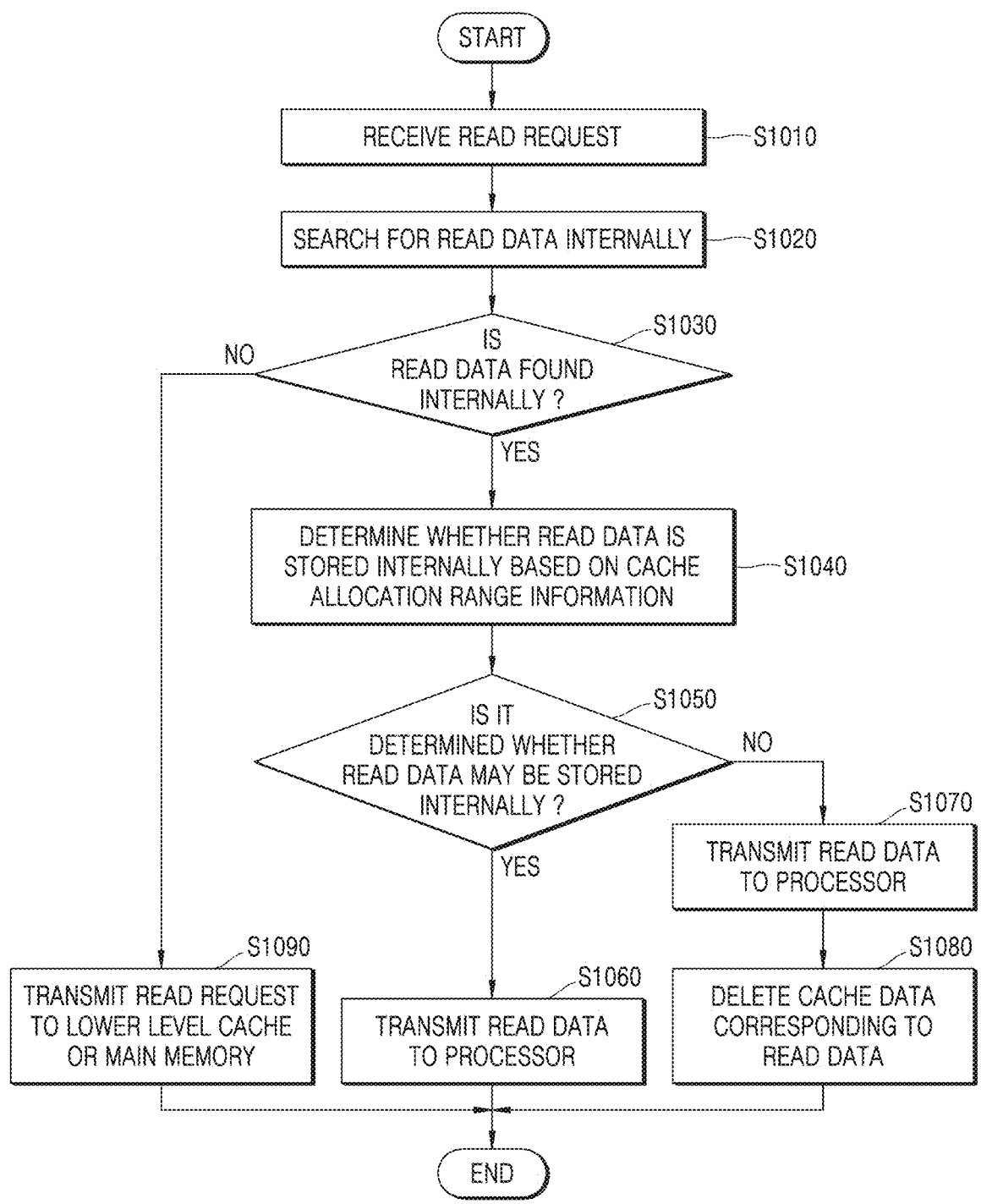
FIG. 10 is a flowchart illustrating an operation when a cache included in an electronic device receives a read request, according to at least one example embodiment.

FIG. 10 is a flowchart illustrating an operation when a cache included in an electronic device receives a read request, according to at least one example embodiment.

Referring to FIG. 10, in operation S1010, each of a plurality of caches 200 may receive a read request.

In operation S1020, each of a plurality of caches 200 may search for read data stored in itself.

In operation S1030, when a respective cache determines that the read data is found internally as a result of the determination of operation S1020, the respective cache of the plurality of caches 200 may move to operation S1040.

In operation S1040, the respective cache of the plurality of caches 200 may determine whether read data may be stored internally based on the cache allocation range information included in the read request.

The respective cache of the plurality of caches 200 may determine whether it is included in the cache allocation range information included in the read request, and thus may determine whether read data may be stored therein. The respective cache of the plurality of caches 200 may determine whether it is not included in the cache allocation range information included in the read request, and thus may determine whether read data may not be stored therein.

In operation S1050, when the respective cache determines that the read data is stored internally as a result of the determination of operation S1040, the respective cache of the plurality of caches 200 may transmit the found read data to the processor 300 in operation S1060.

On the contrary, in operation S1050, even when the respective cache determines that the read data may not be stored internally as a result of the determination of operation S1040, the respective cache of the plurality of caches 200 may transmit the found read data to the processor 300 in operation S1070.

In addition, in operation S1080, the respective cache of the plurality of caches 200 may delete previously stored cache data corresponding to the read data. Accordingly, data not corresponding to the requested read operation may be reduced and/or prevented from being stored in the plurality of caches 200.

On the contrary, in operation S1030, when the respective cache determines that the read data is not found as a result of the search in operation S1020, the respective cache of the plurality of caches 200 may transmit a read request to the lower level cache and/or the main memory 100 in operation S1090.

Figure 11:
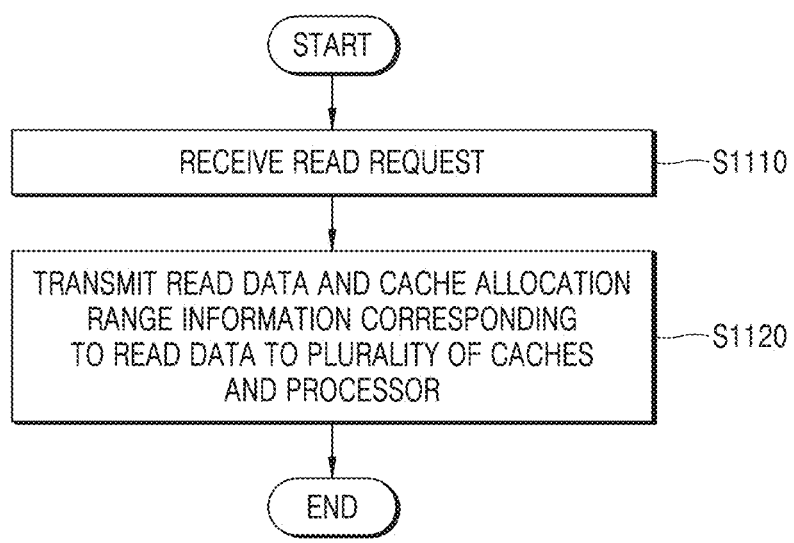
FIG. 11 is a flowchart illustrating an operation when a main memory included in an electronic device receives a read request, according to at least one example embodiment.

FIG. 11 is a flowchart illustrating an operation when a main memory included in an electronic device receives a read request, according to at least one example embodiment.

Referring to FIG. 11, in operation S1110, the main memory 100 may receive a read request from the plurality of caches 200 (e.g., from the LLC 240, from the lowest potential cache for the read request based on the cache allocation range information, etc.), for example, when none of the plurality of caches 200 store the requested data of the read request, etc. Upon receiving the read request, the main memory 100 may search for read data corresponding to the read request in an internal program area and utilize the cache allocation range information included in the read request, but is not limited thereto.

In operation S1120, the main memory 100 may transmit the requested read data and cache allocation range information corresponding to the read data to the plurality of caches and/or the processor, etc.

Figure 12:
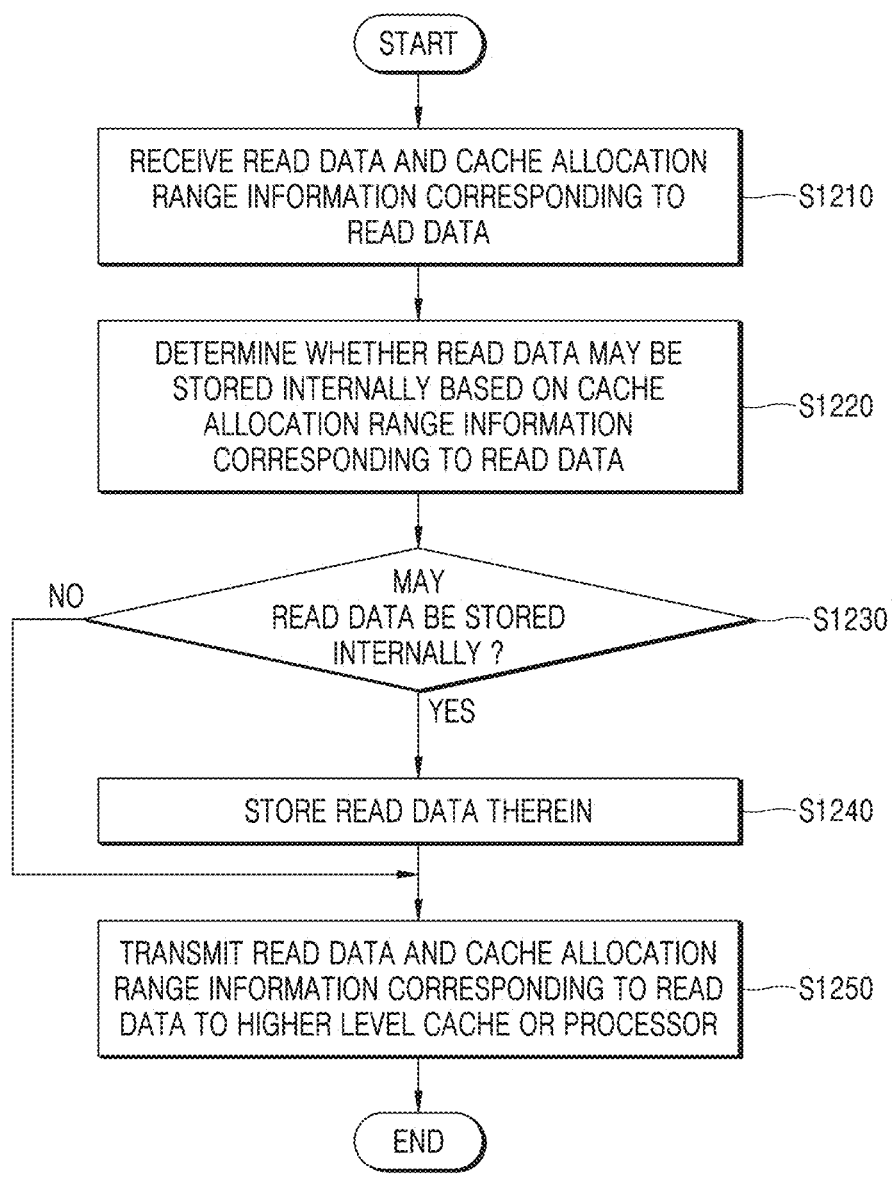
FIG. 12 is a flowchart illustrating an operation when a cache included in an electronic device according to at least one example embodiment receives read data and cache allocation range information corresponding to the read data.

FIG. 12 is a flowchart illustrating an operation when a cache included in an electronic device according to at least one example embodiment receives read data and cache allocation range information corresponding to the read data.

Referring to FIG. 12, in operation S1210, each of the plurality of caches 200 may receive read data and cache allocation range information corresponding to read data, but the example embodiments are not limited thereto, etc.

In operation S1220, each of the plurality of caches 200 may determine whether read data may be stored internally based on the cache allocation range information corresponding to the read data.

Each of the plurality of caches 200 may determine whether to be included in the cache allocation range information corresponding to the read data, and thus may determine whether read data may be stored therein. Each of the plurality of caches 200 may determine whether they are included in the cache allocation range information corresponding to the read data, and thus, may determine whether read data may be stored therein. Each of the plurality of caches 200 may determine whether they are not included in the cache allocation range information corresponding to the read data, and thus, may determine whether read data may not be stored therein.

In operation S1230, when the read data may be stored internally as a result of the determination of operation S1220, the respective cache of the plurality of caches 200 may move to operation S1240.

In operation S1240, the respective cache (e.g., the cache (s) which have determined that they may store the read data) of the plurality of caches 200 may store read data therein. In addition, the respective cache of the plurality of caches 200 may transmit the read data and the cache allocation range information corresponding to the read data to the next higher level cache and/or the processor 300 by moving to operation S1250.

On the contrary, in operation S1230, when the respective cache has determined that the read data may not be stored therein as a result of the determination of operation S1220, the respective cache of the plurality of caches 200 may move immediately to operation S1250 to transmit the read data and the cache allocation range information corresponding to the read data to the higher level cache and/or the processor 300.

Figure 13:
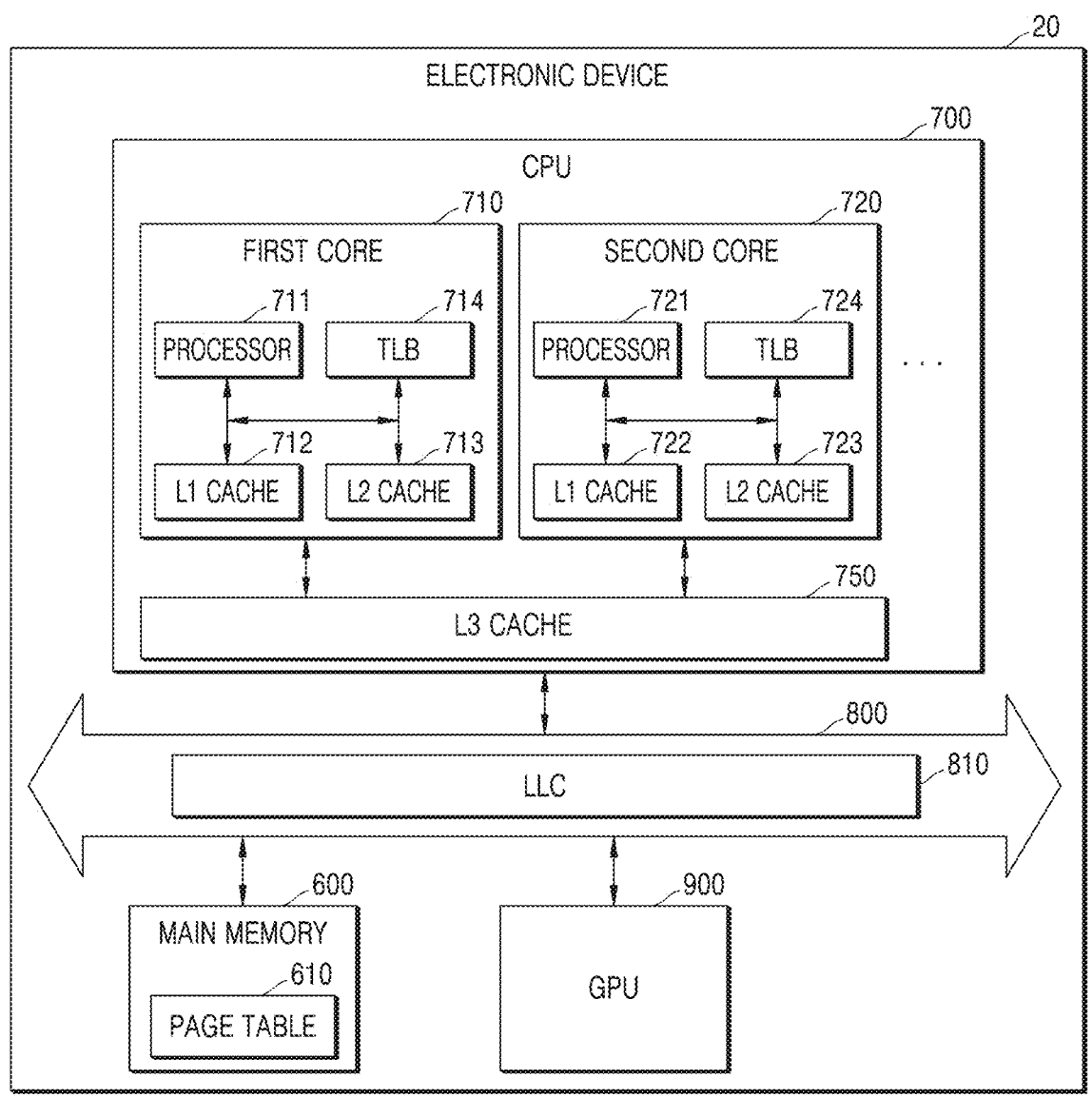
FIG. 13 is a block diagram illustrating an electronic device according to at least one example embodiment.

FIG. 13 is a block diagram illustrating an electronic device according to at least one example embodiment.

Referring to FIG. 13, in at least one example embodiment, an electronic device 20 may include main memory 600, at least one CPU 700, at least one bus 800, and/or at least one graphics processing unit 900, etc., but is not limited thereto. According to some example embodiments, the main memory 600, at least one CPU 700, at least one bus 800, and/or the at least one graphics processing unit (GPU) 900, etc. may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The main memory 600 may store at least one page table 610. The main memory 600 and the page table 610 included therein shown in FIG. 13 may perform substantially the same operation as the main memory 100 and the page table 110 included therein shown in FIG. 2, but is not limited thereto.

The CPU 700 may control the overall operation of the electronic device 20. The CPU 700 may be a multi-core CPU including a plurality of cores, and for example, the CPU 700 may include at least a first core 710 and a second core 720, etc.

The first core 710 may include a processor 711, an L1 cache 712, an L2 cache 713, and a TLB 714, but is not limited thereto. In addition, the second core 720 may include a processor 721, an L1 cache 722, an L2 cache 723, and a TLB 724, but is not limited thereto. As shown in FIG. 13, the processor 711 included in the first core 710 and the processor 721 included in the second core 720 may perform substantially the same operation as the processor 300 shown in FIG. 2, but the example embodiments are not limited thereto. In addition, as shown in FIG. 13, the L1 cache 712 included in the first core 710 and the L1 cache 722 included in the second core 720 may perform substantially the same operation as the L1 cache 210 shown in FIG. 2, but the example embodiments are not limited thereto. In addition, as shown in FIG. 13, the L2 cache 713 included in the first core 710 and the L2 cache 723 included in the second core 720 may perform substantially the same operation as the L2 cache 220 shown in FIG. 2, but the example embodiments are not limited thereto. In addition, as shown in FIG. 13, the TLB 714 included in the first core 710 and the TLB 724 included in the second core 720 may perform substantially the same operation as the TLB 400 shown in FIG. 2, but the example embodiments are not limited thereto.

The CPU 700 may include an L3 cache 750. In at least one example embodiment, the L3 cache 750 may be a cache shared by a processor 711 included in the first core 710 and a processor 721 included in the second core 720, but is not limited thereto. As shown in FIG. 13, the L3 cache 750 may perform substantially the same operation as the L3 cache 230 illustrated in FIG. 2, but the example embodiments are not limited thereto.

The bus 800 may provide at least one communication path between one or more components of the electronic device 20. The bus 800 may include an LLC 810. In at least one example embodiment, the LLC 810 may be a cache shared by a processor 711 included in the first core 710 and a processor 721 included in the second core 720, etc. As illustrated in FIG. 13, the LLC 810 may perform substantially the same operation as the LLC 240 illustrated in FIG. 2, but is not limited thereto.

The GPU 900 may control at least one operation related to graphic processing within the electronic device 20, etc. The GPU 900 may be connected to the main memory 600 and the CPU 700 through the bus 810. Although not shown in the drawings, the GPU 900 may include one or more cores and may have a cache structure similar to that of the CPU 700, but is not limited thereto.

Figure 14:
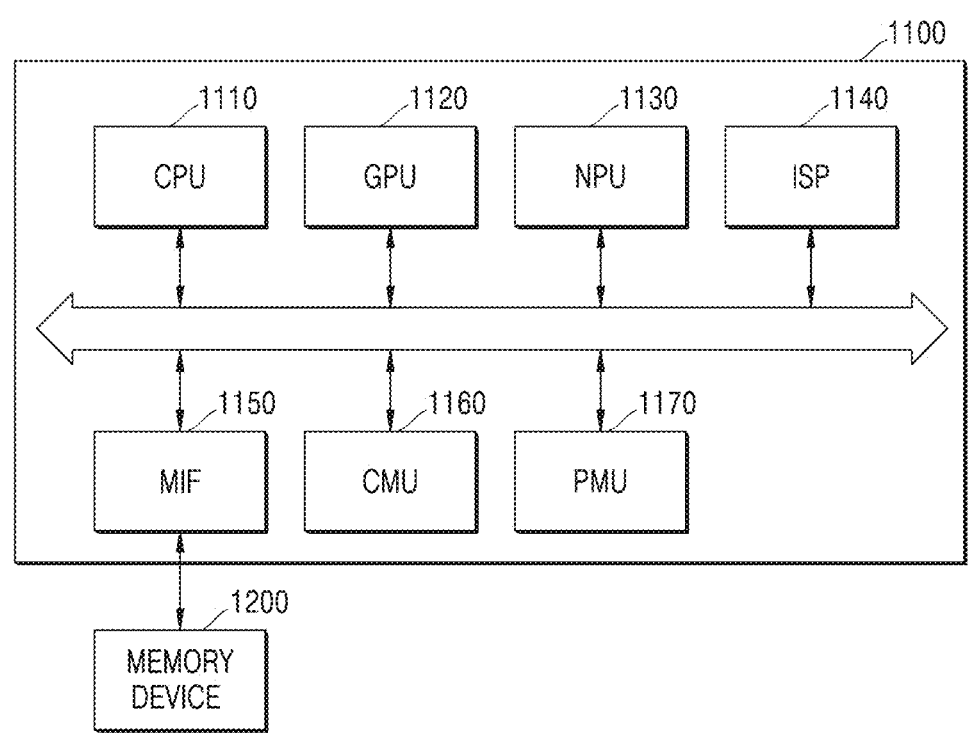
FIG. 14 is a block diagram illustrating a system according to at least one example embodiment.

FIG. 14 is a block diagram illustrating a system according to at least one example embodiment.

Referring to FIG. 14, a system 30 may be implemented as a handheld device such as a mobile phone, a smartphone, a tablet, a personal computer, a laptop, a server, a PDA, an enterprise digital assistant (EDA), a digital still camera, a digital video camera, a portable multimedia player (PMP), a personal navigation device (PDN), a handheld game console, a virtual reality device and/or an augmented reality device, an Internet of Things (IoT) device, an autonomous vehicle, and/or an e-book, etc., but the example embodiments are not limited thereto.

The system 30 may include a SoC 1100 and a memory device 1200, etc., but is not limited thereto. The SoC 1100 includes a CPU 1110, a GPU 1120, a neural processing unit (NPU) 1130, an image signal processor (ISP) 1140, a memory interface (MIF) 1150, a clock management unit (CMU) 1160, and/or a power management unit (PMU) 1170, etc. The CPU 1110, the GPU 1120, the NPU 1130, the ISP 1140, and the MIF 1150 may be examples of the electronic device 10 described above with reference to FIGS. 1 to 12, but the example embodiments are not limited thereto. According to some example embodiments, one or more of the SoC 1100, the memory device 1200, the CPU 1110, the GPU 1120, the NPU 1130, the ISP 1140, the MIF 1150, the CMU 1160, and/or the PMU 1170, etc. may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The CPU 1110 may process and/or execute commands and/or data stored in the memory device 1200 in response to at least one clock signal generated by the CMU 1160, etc.

The GPU 1120 may acquire image data stored in the memory device 1200 in response to a clock signal generated by the CMU 1160. The GPU 1120 may also generate data for an image output through a display device (not shown) from image data provided from the MIF 1150, and/or may also encode the image data, etc.

The NPU 1130 may refer to any device that executes a machine learning model, an artificial intelligence model, a neural network model, etc. The NPU 1130 may be a hardware block and/or circuitry designed to execute a machine learning model, etc. The machine learning model may be a model based on an artificial neural network, a decision tree, a support vector machine, a regression analysis, a Bayesian network, a genetic algorithm, etc. The artificial neural network may include, as a non-limiting example, a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and/or a classification network, etc.

The ISP 1140 may perform at least one signal processing operation on raw data received from an image sensor (not shown) located outside of (e.g., external to) the SoC 1100 and may generate digital data having improved image quality, etc.

The MIF 1150 may provide an interface to the memory device 1200 located outside of (e.g., external to) the SoC 1100. The memory device 1200 may be DRAM, PRAM, resistive random access memory (ReRAM), and/or flash memory, etc.

The CMU 1160 may generate at least one clock signal and provide the at least one clock signal to one or more of the components of the SoC 1100. The CMU 1160 may include a clock generation device, such as a phase locked loop (PLL), a delayed locked loop (DLL), crystal, and/or the like. The PMU 1170 may convert external power into internal power and supply the internal power to one or more components of the SoC 1100.

While various example embodiments of the inventive concepts have been particularly shown and described, it will be understood that various changes in form and details may be made therein without departing from the spirit and scope of the following claims.

What is claimed is:
1. An electronic device comprising:
   a main memory;
   a plurality of caches that are hierarchically connected, the plurality of caches each configured to store part of data stored in the main memory, the plurality of caches including an uppermost level cache in a closest proximity to processing circuitry and a lowermost level cache in a closest proximity to the main memory; and
   the processing circuitry configured to transmit a memory request for desired data to the uppermost level cache, the memory request including cache allocation range information associated with the desired data, and
   wherein each of the plurality of caches is configured to determine whether to perform an operation corresponding to the memory request based on the cache allocation range information, and
   wherein the cache allocation range information comprises allocation start level information indicating a highest level cache among the plurality of caches in which the desired data corresponding to the memory request may be stored, and
   allocation end level information indicating a lowest level cache among the plurality of caches in which the desired data corresponding to the memory request may be stored.
2. The electronic device of claim 1, wherein the main memory is configured to store a page table including a plurality of page entries, each page entry of the plurality of page entries including cache allocation range information corresponding to data associated with the respective page entry.
3. The electronic device of claim 2, further comprising:
   a Translation Look-aside Buffer (TLB) configured to store page entries corresponding to data accessed by the processing circuitry.
4. The electronic device of claim 1, wherein the processing circuitry is further configured to:
   set the cache allocation range information based on any one of a delay time and throughput desired to process the memory request, the setting the cache allocation range information including,
   set the cache allocation range information to include the uppermost level cache of the plurality of caches based on the delay time desired for processing the memory request and a reference delay time, and
   set the cache allocation range information to include a least significant level cache of the plurality of caches based on the throughput desired for processing the memory request and a reference throughput.
5. The electronic device of claim 1, wherein the processing circuitry is further configured to set the cache allocation range information based on an intended usage of the desired data.
6. The electronic device of claim 1, wherein each of the plurality of caches is configured to:
   in response to receiving the memory request, determine whether the desired data corresponding to the memory request may be stored therein based on the cache allocation range information;
   in response to determining that the desired data corresponding to the memory request may be stored therein, perform the operation corresponding to the memory request; and
   in response to determining that the desired data corresponding to the memory request may not be stored therein, not performing the operation corresponding to the memory request.
7. The electronic device of claim 1, wherein each of the plurality of caches is configured to:
   in response to the memory request being a write request and determining that the desired data corresponding to the write request may be stored internally based on the cache allocation range information, store the desired data internally, and transmit the write request to a lower level cache of the plurality of caches or the main memory; and
   in response to the memory request being the write request and determining that the desired data corresponding to the write request may not be stored internally based on the cache allocation range information, transmit the write request to the lower level cache of the plurality of caches or the main memory.
8. The electronic device of claim 7, wherein a respective cache of the plurality of caches is configured to:
   in response to the memory request being the write request and determining that the desired data corresponding to the write request may not be stored internally based on the cache allocation range information, search for invalid cache data corresponding to the write request in the respective cache; and
   in response to the invalid cache data corresponding to the write request being found in the respective cache, delete the invalid cache data corresponding to the write request.
9. The electronic device of claim 8, wherein each of the plurality of caches is configured to, in response to the invalid cache data corresponding to the desired data being found internally, write the desired data over the invalid cache data corresponding to the write request.
10. The electronic device of claim 1, wherein each of the plurality of caches is configured to:
    in response to the memory request being a read request, search for the desired data corresponding to the read request internally;

in response to the desired data not being found internally, transmit the read request to a lower level cache of the plurality of caches or the main memory;

in response to the desired data being found internally, determine whether the desired data corresponding to the read request may be stored internally based on the cache allocation range information;

in response to the desired data being stored internally, transmit the desired data to the processing circuitry; and in response to the desired data not being stored internally, transmit the desired data to the processing circuitry, and delete invalid cache data corresponding to the read request.

11. The electronic device of claim 10, wherein the main memory is configured to, in response to receiving the read request, transmit the read request and the cache allocation range information corresponding to the read request to the plurality of caches and the processing circuitry; and each of the plurality of caches is configured to, in response to determining that the desired data may be stored internally based on the cache allocation range information corresponding to the read request,
store the desired data internally, and
transmit the cache allocation range information corresponding to the desired data to a higher level cache of the plurality of caches or the processing circuitry, and in response to determining that the desired data may not be stored internally based on the cache allocation range information corresponding to the read request,
transmit the desired data and the cache allocation range information corresponding to the desired data to the higher level cache of the plurality of caches or the processing circuitry.

12. The electronic device of claim 1, wherein the processing circuitry is further configured to:

store the cache allocation range information; and search for a cache among the plurality of caches which stores the desired data corresponding to the memory request based on the cache allocation range information.

13. An electronic device comprising:
a main memory;
a plurality of caches hierarchically connected, the plurality of caches each configured to store part of data stored in the main memory, the plurality of caches including an uppermost level cache in a closest proximity to processing circuitry and a lowermost level cache in a closest proximity to the main memory; and
the processing circuitry configured to transmit a memory request for desired data to the uppermost level cache, the memory request including cache allocation range information associated with the desired data,
wherein each of the plurality of caches is configured
to perform an operation based on a type of the memory request and the cache allocation range information, and
wherein the main memory is configured to store a page table including a plurality of page entries, each page entry of the plurality of page entries including cache allocation range information corresponding to data associated with the respective page entry.

14. The electronic device of claim 13, wherein each of the plurality of caches is configured to:

in response to the memory request being a write request and determining that the desired data corresponding to the write request may be stored internally based on the cache allocation range information associated with the desired data, store the desired data internally;

in response the write request having a write-through characteristic, transmit the write request to a lower level cache of the plurality of caches or the main memory; and in response to the memory request being a write request and determining that the desired data may not be stored internally based on the cache allocation range information associated with the desired data, transmit the write request to the lower level cache or the main memory.

15. The electronic device of claim 13, wherein each of the plurality of caches is configured to:

in response to the memory request being a read request, search for the desired data internally;

in response to the desired data not being found internally, transmit the read request to a lower level cache of the plurality of caches or the main memory;

in response to the desired data being found internally, determining whether the desired data corresponding to the read request may be stored internally based on the cache allocation range information associated with the desired data;

in response to determining that the desired data may be stored internally, transmitting the desired data to the processing circuitry; and in response to determining that the desired data may not be stored internally, transmitting the desired data to the processing circuitry, and deleting invalid cache data corresponding to the desired data.

16. The electronic device of claim 15, wherein in response to the main memory receiving the read request, the main memory is configured to transmit the desired data and the cache allocation range information corresponding to the desired data to the plurality of caches and the processing circuitry; and each of the plurality of caches is configured to, in response to determining that the desired data may be stored internally based on the cache allocation range information corresponding to the read request,
store the desired read data internally, and
transmit the cache allocation range information corresponding to the desired data to a higher level cache or the processing circuitry, and in response to determining that the desired data may not be stored internally based on the cache allocation range information corresponding to the read request,
transmit the desired data and the cache allocation range information corresponding to the read request to the higher level cache or the processing circuitry.

17. An electronic device comprising:
a main memory;
a central processing unit (CPU) including a plurality of cores; and
a bus connecting the main memory and the CPU, wherein each of the plurality of cores comprises
processing circuitry configured to transmit a memory request for desired data, the memory request including cache allocation range information associated with the desired data,
a first level cache configured to receive the memory request from the processing circuitry, and store part of data stored in the main memory, and a second level cache configured to receive the memory request from the first level cache, and store part of the data stored in the main memory, the CPU further includes a third level cache configured to receive the memory request from the second level cache of one of the plurality of cores, and store part of the data stored in the main memory, the bus further includes a fourth level cache configured to receive the memory request from the third level cache, and store part of the data stored in the main memory, the cache allocation range information includes information indicating a cache among the first level to fourth level caches in which data corresponding to the memory request may be stored, and each of the first level to fourth level caches is configured to determine whether to perform an operation corresponding to the memory request based on the cache allocation range information.

18. The electronic device of claim 17, wherein the main memory is configured to store a page table including a plurality of page entries, each page entry of the plurality of page entries including cache allocation range information associated with data stored in the respective page entry; and each of the plurality of cores further comprises a translation look-aside buffer (TLB) configured to store a page entry corresponding to data accessed by the processing circuitry inside a corresponding core of the plurality of cores.

19. The electronic device of claim 17, wherein the processing circuitry of each of the plurality of cores is configured to:

set the cache allocation range information based on any one of a delay time and throughput desired for processing the memory request;

set the cache allocation range information to include an uppermost level cache of the first level to fourth level caches based on the delay time desired for processing the memory request and a reference delay time; and set the cache allocation range information to include a least significant level cache of the first level to fourth level caches based on the throughput desired for processing the memory request and a reference throughput.

* * * * *